US008220240B2

(12) United States Patent
Tielbürger

(10) Patent No.: US 8,220,240 B2
(45) Date of Patent: Jul. 17, 2012

(54) DEVICE FOR LANDSCAPE CARE WITH SPRING TINE RAKE

(76) Inventor: Dirk Tielbürger, Rahden (DE)

( * ) Notice: Subject to any disclaimer, the term of this patent is extended or adjusted under 35 U.S.C. 154(b) by 0 days.

(21) Appl. No.: 12/817,272

(22) Filed: Jun. 17, 2010

(65) Prior Publication Data

US 2010/0326036 A1    Dec. 30, 2010

(30) Foreign Application Priority Data

Jun. 18, 2009  (DE) .......................... 10 2009 029 805

(51) Int. Cl.
*A01D 7/00*    (2006.01)
(52) U.S. Cl. ............... 56/400.04; 56/193; 56/400.17; 56/400.18
(58) Field of Classification Search ............ 56/396, 56/16.1, 193, 400.19, 400.17, 400.18, 400.04; 172/42, 45, 29, 622, 707; 15/340.4, 354, 15/284, 332, 78, 202, 194, 54
See application file for complete search history.

(56) References Cited

U.S. PATENT DOCUMENTS

| | | | | |
|---|---|---|---|---|
| 417,477 A * | 12/1889 | Dundon | ............... | 15/54 |
| 2,143,402 A * | 1/1939 | Baker | ............... | 56/249 |
| 2,268,519 A * | 12/1941 | Teager | ............... | 15/78 |
| 2,722,795 A * | 11/1955 | Warner | ............... | 56/249 |
| 2,751,741 A * | 6/1956 | Carson | ............... | 56/400.04 |
| 2,789,298 A * | 4/1957 | Peterson | ............... | 401/46 |
| 2,794,309 A * | 6/1957 | Tabac | ............... | 56/249 |
| 2,973,535 A * | 3/1961 | Olay | ............... | 15/78 |
| 3,129,944 A * | 4/1964 | Amos et al. | ............... | 473/278 |
| 3,134,129 A * | 5/1964 | Allen | ............... | 401/138 |
| 3,438,183 A * | 4/1969 | Puretic | ............... | 56/16.1 |
| 3,646,736 A * | 3/1972 | Hutchins | ............... | 56/16.9 |
| 4,151,701 A * | 5/1979 | Marto | ............... | 56/16.1 |
| 4,317,327 A | 3/1982 | Doering | | |
| 4,322,936 A * | 4/1982 | Whitney | ............... | 56/16.1 |
| RE32,551 E * | 12/1987 | Doering | ............... | 56/396 |
| D298,138 S * | 10/1988 | Starr | ............... | D15/27 |
| 4,987,731 A * | 1/1991 | Cianciulli et al. | ............... | 56/17.5 |
| 5,621,940 A * | 4/1997 | Lewis et al. | ............... | 15/78 |
| 5,774,922 A * | 7/1998 | Bumb | ............... | 15/159.1 |
| 5,833,013 A * | 11/1998 | Davis | ............... | 172/612 |
| 5,922,968 A * | 7/1999 | Briscoe | ............... | 73/818 |
| 6,088,865 A * | 7/2000 | Truan et al. | ............... | 15/78 |
| 6,122,904 A * | 9/2000 | Garcia de Alba | ............... | 56/16.9 |
| 6,199,356 B1 * | 3/2001 | Moreno | ............... | 56/193 |
| 6,308,505 B1 * | 10/2001 | Beckett | ............... | 56/16.7 |
| 6,574,828 B2 * | 6/2003 | Hile | ............... | 15/340.4 |
| 7,020,930 B2 * | 4/2006 | Hile | ............... | 15/340.4 |

(Continued)

FOREIGN PATENT DOCUMENTS

DE    19905450 A1 * 12/2000

*Primary Examiner* — Arpad Fabian-Kovacs
(74) *Attorney, Agent, or Firm* — Gudrun E. Huckett

(57) ABSTRACT

A landscape care device has a first care tool embodied as a mowing device, a sweeping broom, or the like, and at least one second care tool in the form of a spring tine rake arranged in front of the first care tool and acting simultaneously or with time shift relative to the first care tool. A carriage with a front axle is provided, wherein only the spring tine rake is effective in front of the front axle of the carriage. The spring tine rake has spring tines and the spring line rake is designed such that the spring tines are effective by a substantially straight push movement exerted on the spring tine rake.

19 Claims, 4 Drawing Sheets

U.S. PATENT DOCUMENTS

| | | | |
|---|---|---|---|
| 7,065,947 B1 * | 6/2006 | Street et al. | 56/371 |
| 8,001,753 B2 * | 8/2011 | Franco | 56/15.9 |
| 2006/0218890 A1 * | 10/2006 | Welch | 56/400.04 |
| 2006/0236670 A1 | 10/2006 | Glasford | |
| 2006/0282975 A1 * | 12/2006 | Basham et al. | 15/320 |
| 2010/0050586 A1 * | 3/2010 | Franco | 56/193 |
| 2010/0313537 A1 * | 12/2010 | Lundberg | 56/14.9 |
| 2010/0326679 A1 * | 12/2010 | Tielburger | 172/29 |

\* cited by examiner

DEVICE FOR LANDSCAPE CARE WITH SPRING TINE RAKE

BACKGROUND OF THE INVENTION

The invention concerns a device for landscape care, preferably in the form of a lawn tractor, a sweeping machine or like machine for treating lawns, comprising a first care tool embodied as a mowing device, a sweeping broom, or the like and at least one second care tool in the form of a dethatching device or the like and acting simultaneously or with time shift relative to the first care tool.

Machines for treating lawns that are driven by an electric motor or internal combustion engine are known in various embodiments. These motor-driven lawn tractors, sweeping machines and the like are provided with appropriate care tools. In case of machines that are in particular in the form of a riding machine, in a combined configuration front mowing devices are useable in combination with a mulching device or the like. Known lawn tractors are also provided with a central mowing device that may interact as needed with a lateral ejector, rear ejector and/or a mulching function.

In all of these machines, referred to as mulching mowers, the lawn is cut and the cut material remains on the lawn surface to decompose. In central mowing devices the lawn is cut and the cuttings are conveyed into a collecting container. When in addition to the central mowing device a mulching blade is provided on the machine, a larger quantity of cuttings reaches the collecting container. In any case, smallest parts of cuttings remain on the lawn and the lawn can form as a result of stagnant moisture and dryness a felted layer or moss layers can form for which reason an additional dethatching step must be carried out.

Lawn tractors are also known that have a trailing dethatching device wherein the latter has an additional drive motor which increases the complexity of the system significantly. Known are also simple pull-behind raking devices with which the lawn is combed. However, in a second separate working step a lawn tractor must be used subsequently in order to convey the dethatched material into a collecting container so that here also a treatment with a disadvantageously high expenditure exists.

According to a further proposal it is provided that a lawn tractor is used as a lawn sweeping machine that is arranged behind the respective mowing device. This "sweeping machine" loosens at the same time the felted layer and the moss wherein subsequent collection thereof requires additional expenditure. These lawn tractors also may have a dethatching device mounted thereon as a rear attachment so that a rearward combination with a collecting container is possible but the high technical expenditure often cannot be justified.

Known is also a lawn tractor with central mowing device to which an additional machine with a second motor can be coupled so that a two-engine unit with disadvantageously high technical expenditure must be operated. Also known is a system where directly on the mowing device several spring tines are arranged so that they can be adjustable only together with the mowing device and the treatment is not effective.

The invention concerns the problem to provide a landscape care device with which by interaction of two treatment tools a permanent removal of additionally engageable soil or plant parts is possible and in this way, with minimal technical expenditure, moss or like parts engaged in a first phase can be transferred to or disposed of together with the cut material of the second tool in a collecting container.

SUMMARY OF THE INVENTION

The invention solves this problem with a lawn treatment machine in that the machine in the area in front of the first care tool is provided with at least one spring tine rake as the second care tool. Further advantageous embodiments result from the dependent claims.

A lawn treatment machine that is configured in particular as a lawn tractor comprises a mowing device as a first tool and a dethatcher, known in general, as a second tool. In a construction that comprises these two generally known assemblies it is provided in a combination according to the invention that in the area of a front-side standard coupling a dethatcher embodied as a spring tine rake is to be connected with the machine. This surprisingly simple system of the two tools that are acting sequentially on the soil with optimal spacing and without additional auxiliary drive provides an optimal care already when the spring tine rake is moved as a "pushed" unit in a straight pattern and thus the spring tines, that can only be displaced in a springy fashion in accordance with their arrangement, spring stiffness, and/or engagement parameters in the soil area, can act optimally.

With this arrangement of the spring tines in front of the application area of the driven mowing device or similar tool a permanent dethatching is possible and, in this way, a "preparatory" loosening of the lawn or similar soil structure is possible substantially without additional drive action.

The spring tine rake is designed such that in addition to the provided lawn cutting as a main treatment phase, the spring tines that are each pressed into the soil will comb out the felted layers or moss residues and will convey them in front of the mowing device onto the lawn. With the subsequent engagement of the mowing tools the prepared residual material is picked up together with the lawn as cut material so that the lawn surface in one working step is dethatched, cut and, by movement of the cut material into the collecting chamber, a clean lawn surface is provided also.

In this combined system the advantages of a standard quick coupling of the machine—known per se—are used so that the spring tine rake in the mounted position is positioned in front of the respective front axle of the machine and without additional drive will "comb" the lawn. In the area of this front-side coupling a support parallelogram is active so that in all phases of the dethatching process unevenness of the ground can be compensated with minimal expenditure. The position of the spring tines is optimal in relation to their angled position to the soil, respectively. In an expedient embodiment the spring tine rake is guided by an additional wheel support on the ground. In this connection, two wheels that are mounted on a shaft axle are provided whose wheel diameter determines the respective working depth for the spring tines such that a working depth can be adjusted that is adaptable to the respective ground conditions.

The spring tines that are usable for the construction are provided as monolithic components wherein for securing these spring tines on a holder in the form of a support beam respective through openings and fixation openings are provided such that a force-locking and positive-locking fixation is possible. In this way, additional securing elements in the form of screws, rivets or the like are no longer needed and mounting or demounting of the spring tines can be performed even by less skilled users.

BRIEF DESCRIPTION OF THE DRAWINGS

Further details and advantages of the invention result from the subsequent description and the drawing in which one embodiment of the lawn-treatment machine according to the invention is illustrated in more detail. The drawing shows in.

DESCRIPTION OF PREFERRED EMBODIMENTS

Figure 1:
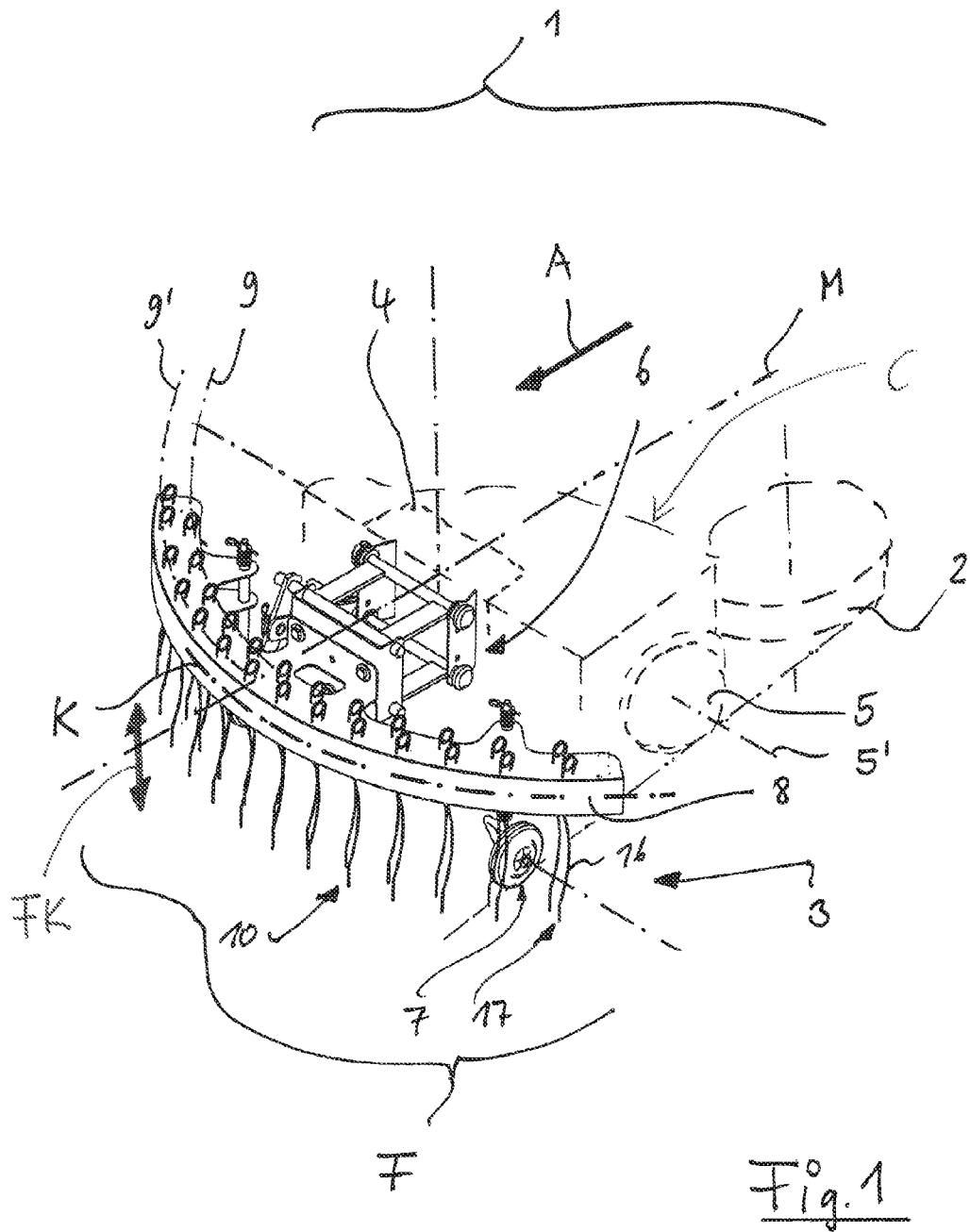
FIG. 1 a perspective principal illustration of the dethatcher embodied as a spring tine rake in accordance with the invention.
Figure 5:
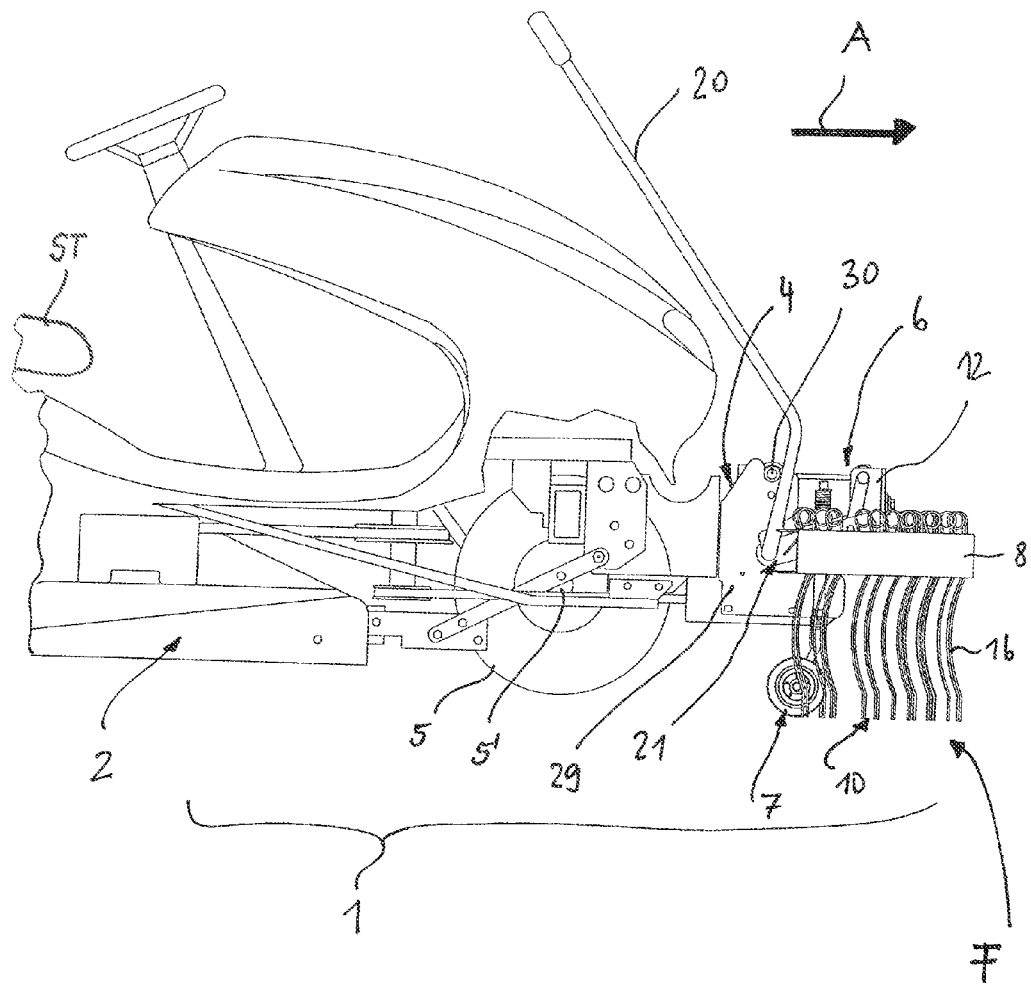
FIG. 5 a partially sectioned side view of a lawn tractor with spring tine rake arranged in front.

In FIG. 1 in a schematic perspective illustration a landscape care device is illustrated that as a whole is referenced by 1 and may be provided in the form of a lawn tractor, a sweeping machine or similar constructions of lawn treatment machines (FIG. 5). Such machines have a first care tool in particular embodied as a driven mowing device 2 and in this machine concept at least a second lawn care tool 3 is provided that can be used at the same time or with time shift relative to the first lawn care tool 2. For use of the machine for lawn treatment in particular a dethatcher can be provided as a second care tool 3.

The concept according to the invention provides that the machine 1 in the area in front of the mowing device 2 is provided with at least one dethatcher that is embodied as a spring tine rake F. This assembly which is matched to an attachment position on the machine 1, respectively, is efficiently effective when a support of the rake F at a front-side position is realized, as indicated in principle in FIG. 1 and FIG. 5.

Figure 2:
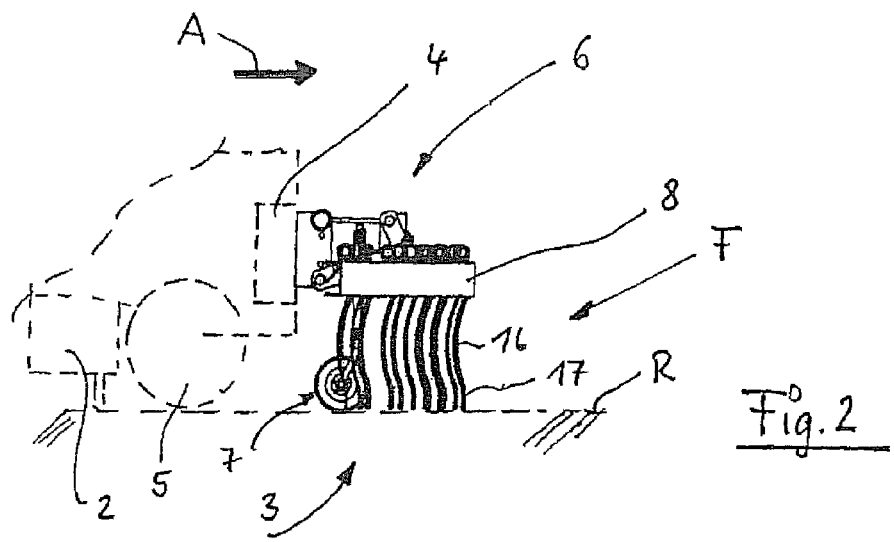
FIG. 2 a side view of the spring tine rake in mounted position.

The construction of the spring tine rake F provides that the latter in the area of a front-side standard coupling 4 (FIG. 5; quick coupling 29 with connector 30 to the spring tine rake F) is to be connected with the machine 1 such that the spring tine rake F in the position of use (FIG. 2) is effective in particular in front of the front axle 5' with support wheels 5 of the carriage C of machine 1 and also in front of the mowing device 2 that in the working direction according to arrow A is arranged behind it.

For optimal securing of the spring tine rake F an adapter is provided in the area of the coupling 4 and is embodied as a parallelogram linkage support 6 which, in turn, can be hooked to the coupling 4 of the machine 1. For an optimal operation of this system it is provided that the spring tine rake F hooked in the area of the coupling 4 can be operated from the driver's seat ST, schematically indicated in FIG. 5, of the machine 1. For this purpose, an operating lever 20 is provided, illustrated in FIGS. 5 and 6, that engages by means of an elbow lever mechanism 21 (FIG. 6) the linkage support 6.

For adaptation of the care device 1 embodied as a lawn care machine to different fields of use, it is provided that the spring tine rake F in the area of the parallelogram linkage support 6 has an adjustability such that horizontal and/or vertical adjusting possibilities are made available (not illustrated). The illustrations according to FIG. 1 to FIG. 6 illustrate that the spring tine rake F secured in the mounting position is supportable on the ground by means of a support element 7 that is embodied as a wheel, a skid or the like.

Figure 6:
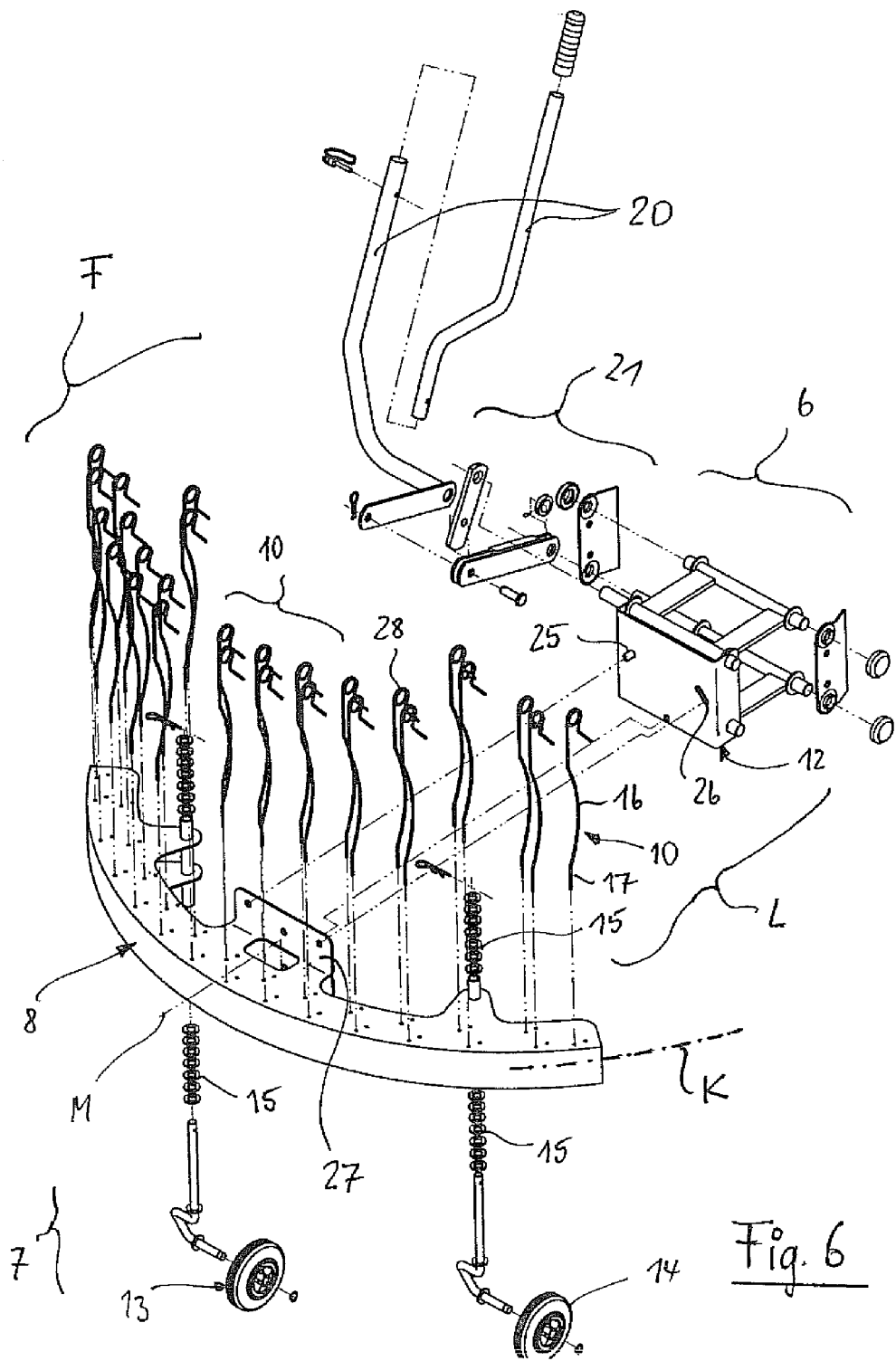
FIG. 6 an exploded view illustrating the individual parts in the area of the spring tine rake.

The spring tine rake F is provided with at least one row 9 of spring tines 10 that extends in the longitudinal direction of the support beam 8. FIG. 1 and FIG. 6 illustrate that on the support beam 8 several parallel rows 9, 9' of the spring tines 10 are provided that are displaced relative to one another with tine-on-gap alignment (tine of a first row 9 is positioned so as to be aligned with a gap between two neighboring tines of adjacent second row 9' as shown in FIG. 1). An optimal embodiment of this spring tine rake F provides that the spring tines 10 are immediately positive-lockingly secured on the support beam 8 substantially without additional connecting parts so that a self locking connecting construction is achieved and, in this way, a problem-free exchange even of individual ones of the spring tines 10 can be carried out.

For an optimal securing of this dethatching device 3 on the machine 1 the support beam 8 in the connecting area to the parallelogram linkage support 6 has a support plate referenced generally by 12 (FIG. 6). With this embodiment the configuration of a spring connection interacting with the coupling 4 (FIG. 5) of the machine 1 is possible such that by means of a tension spring or the like the hooking action of the parallelogram linkage support 6 in the coupling 4 is improved. By means of the spring force (acting as indicated by arrow FK in FIG. 1) the linkage support 6 can be pulled upwardly and in this way can be maintained in a position of optimal height for connection with the coupling 4.

Figure 4:
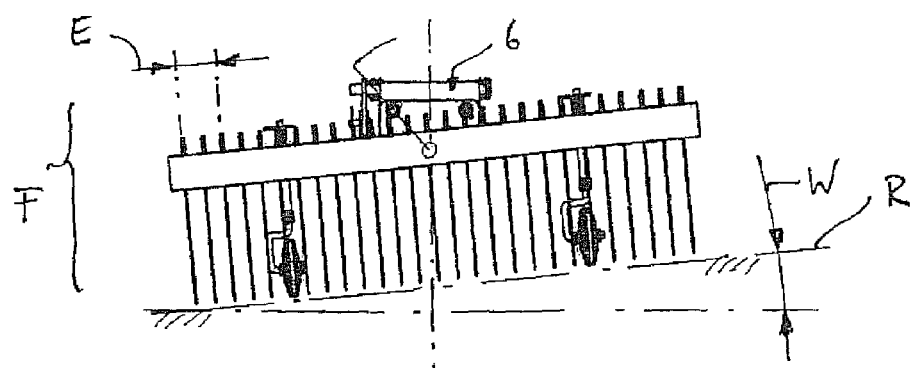
FIG. 4 a front view of the spring tine rake in a pivoted position relative to FIG. 3.

The perspective illustration according to FIG. 1 makes clear that the support beam 8 arranged transversely to the longitudinal center plane M of the machine 1 has a curved longitudinal contour K at least over portions thereof. In deviation to conventionally used straight beam configurations (transverse to the longitudinal center plane M) the support beam 8 is designed in working direction A to be convex so that manipulation of the system with minimal constructive expenditure is improved. Also, in case of this "curved construction" it is provided that the spring tines 10 in longitudinal direction of the support beam 8 each have constant mounting distances E (FIG. 4). In this connection, it becomes apparent that with the convex support beam 8 the outwardly positioned spring tines 10 in any working position are effective in an optimal way.

Figure 3:
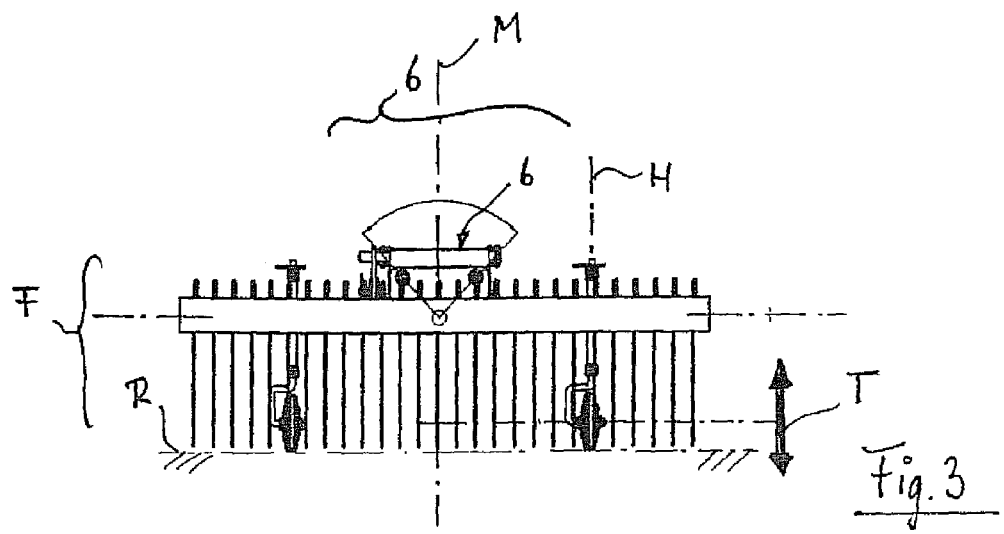
FIG. 3 a front view of the spring tine rake in mounted position.

The illustrations according to FIGS. 3 and 4 make clear that the spring tine rake F in the area of the support beam 8 has two pivot wheels 13, 14 as support element 7 that are arranged in a mirrored arrangement relative to the longitudinal center plane M. They are designed like adjustable ground sensors such that, according to the envisioned application of the system, horizontal and/or vertical changes of the working position of the spring tines 10 are possible. For this purpose, in the area of the support wheels and/or of the supporting carrier 6 appropriate adjusting movements can be provided (not illustrated).

In the illustrated embodiment, the pivot wheels 13, 14 are adjustable by washers or like spacers 15 in the direction of the vertical axis H. With this comparatively simple construction it is achieved that a step-wise adjustment of the working depth or of the pressing force of the spring tines 10 is possible (arrow T, FIG. 3).

In the illustrated embodiment, the support construction is distinguished in that the support wheels 13, 14 provided as ground sensors are effective behind the row of spring tines 10 in the working direction A. Also, it is conceivable that they, or additional ground sensors, are positioned laterally adjacent to the rows of spring tines 10 (not illustrated).

Based on the illustration of different positions of use according to FIGS. 3 and 4 it becomes apparent that the spring tine rake F in the area of the coupling 4 or the parallelogram linkage support 6 may be provided with an axial support L (FIG. 6) for compensation of uneven ground or incline of the working surface R (angle W). By means of this compensation of ground unevenness W in the longitudinal direction M of the lawn tractor 1 a uniform treatment is ensured. In the simplest embodiment the concept provides that the axial support L in the area of the support plate 12 is provided with two slotted holes 25, 26 and by means of appropriate fastening elements (screw/nut principle or locking pin) an adjustable or pivotable holding action is provided. In this way, variable pivoting possibilities of the spring tine rake F can be set wherein in particular the angular adjustment W (FIG. 4) is enabled. With appropriate stops or by means of the length of the slotted holes 25, 26, the pivot travel can be limited and with appropriate damping elements or plastic disks the gliding properties of the pivot system are optimized such that the spring tine rake F in the area of its support plate 27 forms a stable connection to the support plate 12 (FIG. 6).

The spring tines 10 secured on the support beam 8 are manufactured with respect to their contour such that an optimal curvature 16 in the working direction A in the area of the freely extending bristle part 17 is defined. In case of loading of this elastically reacting bristle part 17 upon movement of the system in the travel direction A an elastic deformation or stretching in the area of this arc-shaped curvature 16 occurs and the spring tines 10 engage the ground in an optimal way. In case of a conceivable movement to the rear, opposite to the travel direction A, a deformation in the area of the arc-shaped curvature 16 occurs in such a way that the spring tines 10 engage comparatively softly the soil R and unwanted breakage of the material in the area of the bristle parts 17 is thus avoided.

Also, it is conceivable that the contour of the spring tines 10 can be varied in the area of the upper support contour 28 (FIG. 6) or the curvature 16. In this way, a stronger working of the soil by deeper penetration can be achieved and this optimization of the spring tines 10 or their contour sections can also be designed such that a penetrative or guiding action of the spring tines 10 is achieved. These constructive adaptations may be required when the spring tine rake F according to the invention is used for agricultural soil treatments, not disclosed in detail, wherein in addition to contouring of the spring tines 10 also their number and arrangement on the curved support beam 8 may be realized in a plurality of variations.

What is claimed is:

1. A landscape care device comprising:
a first care tool embodied as a mowing device or a sweeping broom;
at least one second care tool in the form of a spring tine rake arranged in front of the first care tool and acting simultaneously or with time shift relative to the first care tool;
a coupling provided at a front side of the first care tool;
a parallelogram linkage support connected to the spring tine rake and hooked to the coupling to connect the spring tine rake to the front side;
wherein the spring tine rake connected to the coupling is operated from a driver's seat of the landscape care device;
wherein the spring tine rake is positionally adjustable by the parallelogram linkage support;
wherein the spring tine rake comprises a support beam and spring tines supported on the support beam;
wherein the support beam has an elongate shape with a first end and a second end;
wherein the support beam is arranged transversely to a longitudinal center plane of the landscape care device and the first and second ends are positioned opposite each other relative to the longitudinal center plane and spaced from the longitudinal center plane, respectively;
wherein the support beam has a convex arc shape extending from the first end to the second end so that, in a working direction of the landscape care device, the first and second ends are closer to the first care tool than a region of the support beam located on the longitudinal center plane.

2. The landscape care device according to claim 1, comprising a carriage with a front axle, wherein only the spring tine rake is acting on the ground in front of the front axle of the carriage.

3. The landscape care device according to claim 1, wherein the spring tine rake is configured such that the spring tines are acting by a substantially straight push movement exerted on the spring tine rake.

4. The landscape care device according to claim 1, wherein the spring tine rake secured in a position of use is supported by at least one support element in the form of a wheel or a skid on the ground.

5. The landscape care device according to claim 1, wherein the spring tines are arranged on the support beam in at least one row extending in a longitudinal direction of the support beam.

6. The landscape care device according to claim 1, wherein the spring tines are arranged on the support beam in several rows in a longitudinal direction of the support beam, wherein the rows are arranged in parallel.

7. The landscape care device according to claim 1, wherein the spring tines are secured without additional connecting parts in a self-locking way on the support beam of the spring tine rake and are exchangeable.

8. The landscape care device according to claim 1, wherein, in a connecting area of the support beam and the parallelogram linkage support, at least one support plate is provided.

9. The landscape care device according to claim 8, wherein in the connecting area a spring connection is provided that interacts with the coupling.

10. The landscape care device according to claim 1, wherein the spring tines in a longitudinal direction of the support beam are spaced at constant mounting distances.

11. The landscape care device according to claim 1, wherein the spring tine rake in the area of the support beam has two pivot wheels arranged mirror-symmetrically to the longitudinal center plane of the landscape care device.

12. The landscape care device according to claim 11, wherein the pivot wheels are continuously adjustable or step-wise adjustable.

13. The landscape care device according to claim 11, wherein the pivot wheels are adjustable by washers or spacers in variable heights such that a step-wise adjustment of a working depth or a pressing force of the spring tines is enabled.

14. The landscape care device according to claim 1, wherein the spring tine rake comprises least one pivot wheel that in the working direction of the landscape care device is arranged behind rows of the spring tines arranged on the support beam of the spring tine rake.

15. The landscape care device according to claim 14, wherein the at least one pivot wheel is arranged laterally adjacent to the rows of the spring tines.

16. The landscape care device according to claim 1, wherein the spring tine rake in the area of the parallelogram linkage support has an axial support for compensation of uneven ground or inclined positions of the first care tool.

17. The landscape care device according to claim 3, wherein the spring tines each have a freely projecting bristle part that has a curvature that is optimally adjustable in the working direction of the landscape care device.

18. The landscape care device according to claim 1, wherein the spring tines are arranged on the support beam in several rows in a longitudinal direction of the support beam, wherein the rows are arranged in parallel and in a tine-on-gap arrangement relative to each other.

19. The landscape care device according to claim 1, wherein the spring tines are arranged on the support beam in several rows in a longitudinal direction of the support beam, wherein the rows are arranged in a tine-on-gap arrangement relative to each other.

* * * * *